Nov. 5, 1940.  A. A. FORSBERG  2,220,480
HOSE COUPLING
Filed March 23, 1938

INVENTOR.
Carl Albert Forsberg
BY Thomas C. Betts
his ATTORNEY.

Patented Nov. 5, 1940

2,220,480

UNITED STATES PATENT OFFICE 2,220,480

HOSE COUPLING

Axel Albert Forsberg, Stockholm, Sweden, assignor to Electrolux Corporation, Dover, Del., a corporation of Delaware Application March 23, 1938, Serial No. 197,593
In Germany March 31, 1937

4 Claims. (Cl. 285—71)

My invention relates to improvements in flexible hose especially of the type used in connection with vacuum cleaners and more particularly to an improved end structure for a hose.

In order to connect a flexible hose to a vacuum cleaner unit or to any of the various cleaning tools, it is usual to provide a rigid end-piece for the hose. Such end-piece includes a portion having a diameter substantially the same as the outer diameter of the flexible part of the hose, the end of the hose proper being inserted within this portion of the end-piece and being secured thereto by means of glue or other adhesives. Inasmuch as the end of the flexible part of the hose is enclosed, it is protected from injury. However, if the rigid end structure is injured considerable difficulty is experienced in removing it from the flexible part.

One of the objects of my invention is to provide an end structure, which protects the end of the flexible part of the hose and at the same time is readily removable therefrom in order that it may be replaced in case it is damaged. Another object of my invention is to provide an improved means for securing the end structure to the flexible part of the hose.

Further objects and advantages of my invention will be apparent from the following description considered in connection with the accompanying drawing, which forms a part of this specification and of which:

Figure 1:
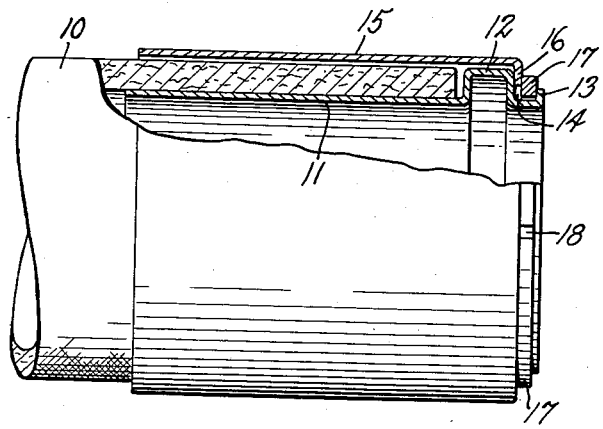
Fig. 1 is a cross-sectional view of one embodiment of my invention.

Referring more particularly to Fig. 1; reference character 10 designates a flexible tubular member forming the flexible part of a hose. Secured within tubular member 10 adjacent to the end thereof is a rigid sleeve 11, the outer diameter of which is substantially equal to the inner diameter of member 10. This sleeve is permanently secured within the tubular member, as by being glued or in any other manner. Sleeve 11 extends beyond the end of tubular member 10 and is there formed on its outer surface with a circular ridge 12 and at its end sleeve 11 is formed with an outwardly extending flange 13. Between flange 13 and ridge 12 there is consequently formed an annular groove 14.

Surrounding tubular member 10 is an outer rigid sleeve 15, one end of which is formed with an inturned flange 16. The inner diameter of flange 16 is less than the outer diameter of ridge 12 but is slightly greater than the outer diameter of flange 13, whereby the outer sleeve may be put in place in the position shown in Fig. 1. A resilient locking ring 17 is adapted to be placed in the groove 14. The inner diameter of ring 17 is less than the outer diameter of flange 13, while the outer diameter of ring 17 is greater than the inner diameter of flange 16. Consequently, when the ring 17 is in place it serves to prevent relative axial movement between the two sleeves. The ring is split, as is indicated at 18 in order to facilitate placing it in position and removing it. The resiliency of the ring causes it to contract in diameter after it has sprung sufficiently to pass over flange 13.

It will be noted that with the end structure as shown in Fig. 1, a rigid reinforcing sleeve is provided at both the inside and the outside of the end of the hose. Moreover, the outer sleeve which is much more likely to be damaged than is the inner is removably secured to the inner sleeve, whereby it may be easily replaced in the event of damage.

Figure 2:
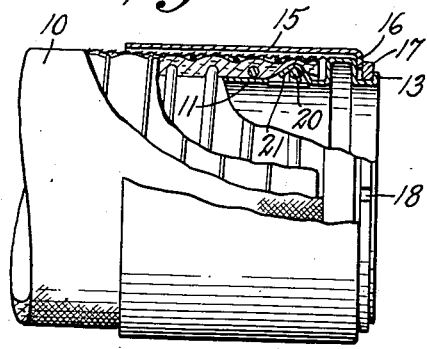
Fig. 2 is a cross-sectional view similar to Fig. 1, but showing a different embodiment of my invention.
Figure 3:
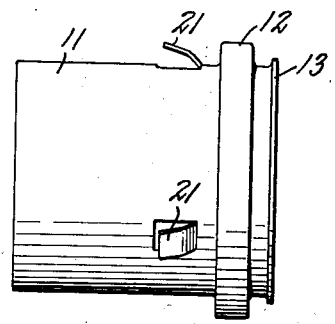
Fig. 3 is a side view of one of the parts included in the device shown in Fig. 2.

The embodiment illustrated in Figs. 2 and 3 differs from that shown in Fig. 1 only in the manner in which the inner sleeve 11 is secured to the flexible portion of the hose. In this embodiment the flexible part comprises flexible material within which is embedded a spiral spring 20. The inner sleeve 11 is formed with projecting members 21, which may be struck from the material of the sleeve. These projecting members are engaged around the spring 20, preferably before the spring is embedded in the material forming the wall of the hose. In this manner the inner sleeve 11 is firmly secured to the flexible portion of the hose.

Figure 4:
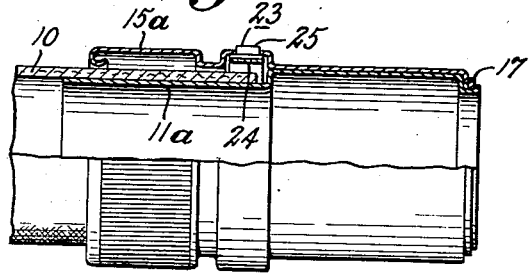
Fig. 4 is a cross-sectional view of a third embodiment of my invention.

When used in connection with a vacuum cleaner, it is desirable that a swivel connection be provided between the hose and the vacuum cleaner unit and between the hose and the tools. In the embodiment shown in Fig. 4 the portion of the inner sleeve 11a which extends beyond the tubular member 10 is of considerable length so as to provide ample bearing surface for rotation between the inner sleeve and the outer sleeve. Also, in this embodiment the outer sleeve 15a is shown as carrying a latching mechanism 23, which includes a spring 24 which urges a catch member 25 outwardly through an opening formed in the sleeve 15a. The catch member is adapted to engage a suitable part on the vacuum cleaner unit or on the tool so as to releasably secure the hose to the unit or the tool. The specific construction of this coupling arrangement does not constitute a part of the present invention and has not been illustrated in detail. However, inasmuch as it is carried by the outer removable sleeve, it may be readily replaced in the event it is damaged.

While I have shown several more or less specific embodiments of my invention, it is to be understood that this has been done for purposes of illustration only and is not intended to limit the scope of my invention, which is to be determined by the appended claims viewed in the light of the prior art.

What I claim is.

1. A hose including a tubular flexible member, a rigid sleeve within said member and permanently connected thereto and extending beyond the end thereof, a rigid outer sleeve freely surrounding said tubular member, and means for rotatably and removably securing said sleeves together beyond said tubular member, the connection between the first mentioned sleeve and said tubular member being entirely independent of said outer sleeve, whereby the outer sleeve is freely rotatable when the parts are assembled.

2. A hose including a tubular flexible member, a rigid sleeve fixed within said member and extending beyond the end thereof, a rigid outer sleeve surrounding said tubular member, means for removably and rotatably securing said sleeves together beyond said tubular member, and coupling means carried by said outer sleeve.

3. A hose including a tubular flexible member, a rigid sleeve within said member and permanently connected thereto and extending beyond the end thereof, a rigid outer sleeve surrounding said tubular member, and a removable locking ring engaging said sleeves beyond said tubular member for removably securing said sleeves together, the connection between the first mentioned sleeve and said tubular member being entirely independent of said tubular sleeve.

4. A protective end fitting for flexible hose comprising a rigid sleeve within the end of the hose and permanently connected thereto and extending outwardly beyond said end, a rigid outer sleeve surrounding and enclosing the end of the hose but slightly spaced throughout its length from the outer surface of the hose, said sleeves being deformed adjacent the end of the hose providing inter-engaging portions, and means detachably locking said portions to one another permitting the outer sleeve to be withdrawn over the end of the hose and the inner sleeve.

AXEL ALBERT FORSBERG.